United States Patent
Lee

(10) Patent No.: US 7,363,067 B2
(45) Date of Patent: Apr. 22, 2008

(54) DAMPING SLIDING RAIL

(75) Inventor: Wen-Shu Lee, San Chung (TW)

(73) Assignee: Quanta Computer Inc., Tao Yuan Shien (TW)

( * ) Notice: Subject to any disclaimer, the term of this patent is extended or adjusted under 35 U.S.C. 154(b) by 555 days.

(21) Appl. No.: 11/130,247

(22) Filed: May 17, 2005

(65) Prior Publication Data
US 2005/0279911 A1    Dec. 22, 2005

(30) Foreign Application Priority Data
Jun. 17, 2004    (TW) ............................... 93209563 U

(51) Int. Cl.
*H04Q 1/00* (2006.01)
*H04B 1/38* (2006.01)

(52) U.S. Cl. ............................ 455/575.4; 455/575.1; 455/575.3; 455/575.8; 455/90.3

(58) Field of Classification Search .. 455/575.3–575.4, 455/575.8, 575.1, 95, 90.3, 128, 425, 346–347, 455/550.1, 556.2; 312/223.2, 223.4; 340/7.63; 248/636

See application file for complete search history.

(56) References Cited

U.S. PATENT DOCUMENTS

| | | | | |
|---|---|---|---|---|
| 5,723,850 A | * | 3/1998 | Lambert | 235/22 |
| 6,353,733 B1 | * | 3/2002 | Murray et al. | 455/90.1 |
| 6,708,046 B1 | * | 3/2004 | Takagi | 455/575.3 |
| 7,034,755 B2 | * | 4/2006 | Takagi | 343/702 |

* cited by examiner

*Primary Examiner*—Meless Zewdu
(74) *Attorney, Agent, or Firm*—Rabin & Berdo, PC

(57) ABSTRACT

A damping sliding rail is described. The damping sliding rail has an elastic member, a buffer member, a buffer stud, a fixing stud, and a switch. The elastic member provides an opening force to open apart a first casing from a second casing. The buffer member provides a damping force to slow down the opening speed between the first casing and the second casing. When the first casing and the second casing are closed together, the fixing stud compresses the elastic member to store an elastic energy for opening apart the first casing from the second casing. When the switch is pressed to open the first casing from the second casing, the fixing stud is released by an indentation of the switch and the buffer stud presses on the buffer member to reduce the opening speed.

20 Claims, 1 Drawing Sheet

US 7,363,067 B2

DAMPING SLIDING RAIL

RELATED APPLICATIONS

The present application is based on, and claims priority from, Taiwan Application Serial Number 93209563, filed Jun. 17, 2004, the disclosure of which is hereby incorporated by reference herein in its entirety.

FIELD OF THE INVENTION

The present invention generally relates to a damping sliding rail. More particularly, the present invention relates to an automatic damping sliding rail with an automatic opening function.

BACKGROUND OF THE INVENTION

Recently, liquid crystal displays (LCD) have been widely applied in electrical products due to the rapid progress of optical and semiconductor technology. Due to the advantages of high image quality, compact size, light weight, low driving voltage, and low power consumption, LCDs have been introduced into many portable electronic apparatuses, e.g. portable computers, mobile phones, video cameras, personal digital assistants, and various consumer electronics. The portable electronic apparatuses employ LCDs not only to enhance the displaying function thereof but also to make user operation convenient.

In addition, with the progress in the telecommunication industry in combination with the rapid progress in optical and semiconductor technology, mobile phones have become ever smaller and lighter weight. New features are added in the mobile phones with each passing day; for example, sending newsletters and e-mail, accessing the Internet, and playing games. Furthermore, a powerful mobile phone can provide personal digital assistant (PDA) functionality.

The display size of the mobile phone has been increasing for the convenience of operating various functions thereof. Accordingly, the keys for operating the various functions have also increased. The single structure mobile phone such as the candy-bar type does not have enough area to fit the keys thereon. Therefore, a clamshell type and a slide type mobile phone have been introduced to enlarge the areas of the display and the keyboard for convenient operation.

In the slide type mobile phone, the keyboard is slid out from the backside of the display for dialing telephone numbers or inputting data. Some of the slide type mobile phones require sliding out the keyboard using both hands, causing the operation to be inconvenient. Other slide type mobile phones provide an automatic open capability with a complicated and expensive mechanism to allow sliding out the keyboard with a single hand.

SUMMARY OF THE INVENTION

It is an object of the present invention to provide a damping sliding rail with an effectively simple sliding structure in combination with a damping device to allow an upper casing and a lower casing of an electronic apparatus to automatically and smoothly be opened and reduce impact force thereon.

It is another object of the present invention to provide a damping sliding rail with a reduced manufacturing cost of a sliding mechanism for opening casings of an electronic apparatus.

To accomplish the above objectives, the present invention provides a damping sliding rail configured in an apparatus with a first casing and a second casing. The damping sliding rail includes a first elastic member, a buffer member, a buffer stud, a fixing stud, and a switch. The first elastic member, e.g. a spring, provides a force for opening apart the first casing and the second casing. The buffer member further provides a damping force for limiting an opening speed between the first casing and the second casing.

When the first casing and the second casing are closed together, the fixing stud compresses the first elastic member to store an elastic energy for automatically opening apart the first casing from the second casing. If a user wishes to open apart the first casing from the second casing, the switch is first pushed toward the casing to release the fixing stud by an indentation of the switch so that the first elastic member releases the stored elastic energy to open the first casing from the second casing. In the meantime, the buffer stud touches and compresses the buffer member to reduce an opening speed of the casings.

The damping sliding rail further includes a sliding mechanism, for example, a sliding trench and sliding rail, disposed in the first casing and the second casing to enhance a sliding stability thereof. The switch further includes a second elastic member, e.g. a spring, to provide a space and a recovering force for moving the switch. The switch further includes an inclined plane for the fixing stud to pass through the indentation when the first casing and the second casing are being closed together, such that the closing may be done without pressing on the switch. The buffer member material is a shock absorbing rubber, a sponge, a foam, or a viscoelastic material.

The damping sliding rail according to the present invention not only automatically opens the casings apart but also reduces impact force on the casings. The damping sliding rail preferably applies to a mobile phone, a PDA, or any similar electronic apparatus to safely and smoothly open displays and keyboards thereof. The damping sliding rail according to the present invention provides a simple and effective mechanism for opening apart casings of electronic apparatuses, allowing low manufacturing cost and thereby allowing automatic opening mechanisms to be applied more widely to electronic apparatuses.

BRIEF DESCRIPTION OF THE DRAWINGS

The foregoing aspects and many of the attendant advantages of this invention are more readily appreciated as the same becomes better understood by reference to the following detailed description, when taken in conjunction with the accompanying drawings, wherein.

DETAILED DESCRIPTION OF THE PREFERRED EMBODIMENT

Figure 1:
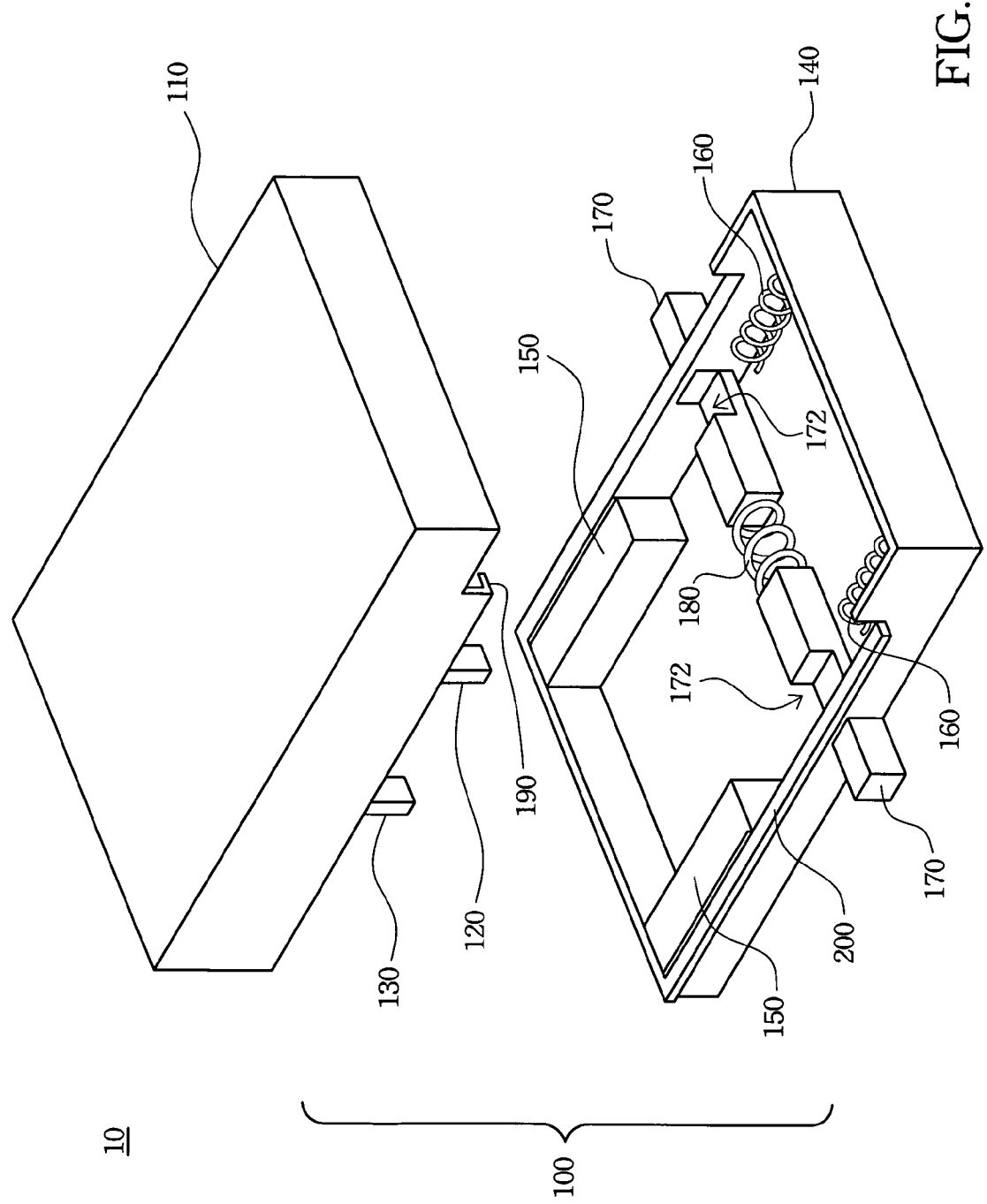
FIG. 1 illustrates a preferred embodiment of a damping sliding rail according to the present invention.

The following description is of the best presently contemplated mode of carrying out the present invention. This description is not to be taken in a limiting sense but is made merely for the purpose of describing the general principles of the invention. The scope of the invention should be determined by referencing the appended claims.

FIG. 1 depicts a preferred embodiment of a damping sliding rail according to the present invention. An apparatus 10 includes a first casing 110 and a second casing 140 corresponding to each other. The first casing 110 is coupled to the second casing 140 by a damping sliding rail 100 according to the present invention. The damping sliding rail 100 further provides a damping force for the first casing 110 when the first casing 110 is moved on the second casing 140 so that a smooth motion of the first casing 110 on the second casing 140 is achieved. An impact force on the first casing 110, while opening apart the first casing 110 from the second casing 140, is also reduced.

The damping sliding rail 100 further includes a first elastic member 160, a buffer member 150, a fixing stud 120, a buffer stud 130, and a switch 170. The first elastic member 160, the buffer member 150 and the switch 170 are disposed in the second casing 140. The fixing stud 120 and the buffer stud 130 are disposed in the first casing 110.

The first elastic member 160 is under a compressive state when the first casing 110 and the second casing 140 are closed together. The fixing stud 120 of the first casing 110 presses on the first elastic member 160 so as to store an elastic energy therein. The first casing 110 is moved toward the buffer member 150 by releasing the stored elastic energy of the first elastic member 160 when the fixing stud 120 is unlocked by the switch 170. Then, the first casing 110 is automatically opened from the second casing 140. Until the buffer stud 130 touches the buffer member 150, the buffer stud 130 compresses the buffer member 150 to provide a damping force for the first casing 110 and to reduce the moving speed of the first casing 110. The first casing 110 is continuously opened apart from the second casing 140 under a low and smooth moving speed until a predetermined extension thereof is achieved.

The first elastic member 160 provides the force to open apart the first casing 110 from the second casing 140. The first elastic member 160, e.g. a spring, provides the desired elastic force with an advantage of having a low manufacturing cost. The switch 170 utilizes an indentation 172 to fix or release the fixing stud 120. When the indentation 172 and the fixing stud 120 are misaligned with each other, the switch 170 fixes the fixing stud 120 so as to prevent a relative motion between the first casing 110 and the second casing 140. When the switch 170 is pressed toward the second casing 140 to align the indentation 172 with the fixing stud 120, the fixing stud 120 can pass through the indentation 172 so as to slide the first casing 110 away from the second casing 140.

An inclined plane can be further utilized on the indentation 172 and/or the fixing stud 120 to enable the first casing 110 and the second casing 140 to be closed together again without pressing the switch 170. That is, by directly manipulating the casings 110 and 140 without pressing the switch 170, the fixing stud 120 can pass through the indentation 172 and then compress the first elastic member 160. Then, the fixing stud 120 is again fixed by the switch 170 to store the elastic energy of the first elastic member 160 for the next opening operation.

The switch 170 further utilizes a second elastic member 180 to provide a space for moving the switch 170 and a recovering force for the switch 170 to return to the original position. The damping sliding rail 100 can be disposed on one side of the apparatus 10 or both sides of the apparatus 10. The first casing 110 and the second casing 140 can be coupled together with a sliding trench 190 and a sliding rail 200 for providing a safe and stable sliding mechanism. The buffer member 150 is selected from any material that can provide a buffer force, e.g. sponge, shock absorbing rubber, foam, or viscoelastic material.

The damping sliding rail according to the present invention can automatically open apart the upper casing from the bottom casing of an apparatus and reduce the shock force while opening the upper casing from the bottom casing. Therefore, the damping sliding rail according to the present invention preferably applies to mobile phones and PDAs to open the display and the keyboard thereof with a smooth and safe movement.

As is understood by a person skilled in the art, the foregoing preferred embodiments of the present invention are illustrative of the present invention rather than limiting of the present invention. It is intended that various modifications and similar arrangements be included within the spirit and scope of the appended claims, the scope of which should be accorded the broadest interpretation so as to encompass all such modifications and similar structures.

What is claimed is:

1. A damping sliding rail applying to an apparatus with a first casing and a second casing corresponding to each other, the damping sliding rail comprising:
   a first elastic member disposed in the second casing to provide a force for opening apart the first casing from the second casing;
   a buffer member disposed in the second casing to provide a damping force for limiting an opening speed of the first casing from the second casing;
   a buffer stud disposed in the first casing to compress the buffer member while opening the first casing from the second casing;
   a fixing stud disposed in the first casing to compress the first elastic member for storing an elastic energy while closing together the first casing and the second casing; and
   a switch disposed in the second casing for fixing or releasing the fixing stud, while releasing the fixing stud, the first elastic member releasing the stored elastic energy to generate a relative motion between the first casing and the second casing, and the buffer stud touching the buffer member to reduce the opening speed.

2. The damping sliding rail of claim 1, wherein the damping sliding rail further comprises:
   a sliding trench disposed in the first casing; and
   a sliding rail disposed in the second casing to couple to the sliding trench.

3. The damping sliding rail of claim 1, wherein the switch further comprises an indentation that releases the fixing stud when the switch is pressed down.

4. The damping sliding rail of claim 3, wherein the switch further comprises a second elastic member to provide a recovering force for the switch.

5. The damping sliding rail of claim 4, wherein the second elastic member comprises a spring.

6. The damping sliding rail of claim 3, wherein the indentation further comprises an inclined plane, such that the fixing stud passes through the indentation by way of the inclined surface when the first casing and the second casing are being closed together.

7. The damping sliding rail of claim 1, wherein the first elastic member comprises a spring.

8. The damping sliding rail of claim 1, wherein the buffer member comprises a shock absorbing rubber.

9. The damping sliding rail of claim 1, wherein the buffer member comprises a sponge.

10. The damping sliding rail of claim 1, wherein the buffer member comprises a viscoelastic material.

11. An apparatus with a damping sliding rail, comprising:
    a first casing;
    a second casing;

a first elastic member disposed in the second casing to provide a force for opening apart the first casing from the second casing;

a buffer member disposed in the second casing to provide a damping force for limiting an opening speed of the first casing relative to the second casing;

a buffer stud disposed in the first casing to compress the buffer member while opening apart the first casing from the second casing;

a fixing stud disposed in the first casing to compress the first elastic member for storing an elastic energy while closing together the first casing and the second casing; and a switch disposed in the second casing for fixing or releasing the fixing stud, while releasing the fixing stud, the first elastic member releasing the stored elastic energy to generate a relative motion between the first casing and the second casing, and the buffer stud touching the buffer member to reduce the opening speed.

12. The apparatus of claim 11, wherein the apparatus further comprises:

a sliding trench disposed in the first casing; and a sliding rail disposed in the second casing to couple to the sliding trench.

13. The apparatus of claim 11, wherein the switch further comprises an indentation releasing the fixing stud when the switch is pressed toward the second casing.

14. The apparatus of claim 13, wherein the switch further comprises a second elastic member to provide a recovering force for the switch.

15. The apparatus of claim 14, wherein the second elastic member comprises a spring.

16. The apparatus of claim 13, wherein the indentation further comprises an inclined plane, such that the fixing stud passes through the indentation by way of the inclined surface when the first casing and the second casing are being closed together.

17. The apparatus of claim 11, wherein the first elastic member comprises a spring.

18. The apparatus of claim 11, wherein the buffer member comprises a shock absorbing rubber.

19. The apparatus of claim 11, wherein the buffer member comprises a sponge.

20. The apparatus of claim 11, wherein the buffer member comprises a viscoelastic material.

* * * * *